(12) United States Patent
David et al.

(10) Patent No.: US 10,669,957 B2
(45) Date of Patent: Jun. 2, 2020

(54) METHOD FOR CONTROLLING A HEAT ENGINE

(71) Applicant: CONTINENTAL AUTOMOTIVE FRANCE S.A.S., Toulouse (FR)

(72) Inventors: Florent David, Suresnes (FR); Frédéric Cousin, Saint Gratien (FR); Damien Fournigault, Pontoise (FR)

(73) Assignee: CONTINENTAL AUTOMOTIVE FRANCE S.A.S., Toulouse (FR)

( * ) Notice: Subject to any disclaimer, the term of this patent is extended or adjusted under 35 U.S.C. 154(b) by 148 days.

(21) Appl. No.: 15/778,634

(22) PCT Filed: Nov. 25, 2016

(86) PCT No.: PCT/FR2016/053103
§ 371 (c)(1),
(2) Date: May 24, 2018

(87) PCT Pub. No.: WO2017/089729
PCT Pub. Date: Jun. 1, 2017

(65) Prior Publication Data
US 2018/0355808 A1 Dec. 13, 2018

(30) Foreign Application Priority Data
Nov. 25, 2015 (FR) ...................... 15 61344

(51) Int. Cl.
*F02D 41/00* (2006.01)
*F02D 41/14* (2006.01)
(Continued)

(52) U.S. Cl.
CPC ..... *F02D 41/0052* (2013.01); *F02D 41/1446* (2013.01); *F02D 41/1454* (2013.01);
(Continued)

(58) Field of Classification Search
CPC ............. F02D 41/0052; F02D 41/1446; F02D 41/1454; F02D 41/22; F02D 41/1475;
(Continued)

(56) References Cited

U.S. PATENT DOCUMENTS 6,152,118 A * 11/2000 Sasaki ................. F02D 41/0275
123/568.21
6,363,922 B1 * 4/2002 Romzek ................. F02M 26/49
701/108

(Continued)

FOREIGN PATENT DOCUMENTS

FR 2911920 A1 8/2008
FR 2 958 334 A1 10/2011
(Continued)

OTHER PUBLICATIONS

An English Machine Translation to Sebastien Vimeux et al. (Pub. No. FR 2 996 897 A1), published on Apr. 18, 2014.*
(Continued)

*Primary Examiner* — Thai Ba Trieu
(74) *Attorney, Agent, or Firm* — Young & Thompson

(57) ABSTRACT

Disclosed is a method for controlling a combustion engine, the combustion engine including an inlet circuit and an exhaust circuit, the method including the steps: determining a temperature of the exhaust gases flowing through the exhaust circuit of the combustion engine; comparing the determined temperature with a maximum threshold; and if the determined temperature is less than the maximum threshold, controlling the engine by decrementing the richness of operation by a predetermined value and jointly incrementing by a predetermined value a level of exhaust gases recirculated between the exhaust circuit and the inlet circuit of the combustion engine.

14 Claims, 2 Drawing Sheets

(51) Int. Cl.
*F02D 41/20* (2006.01)
*F02D 41/22* (2006.01)
*F02D 41/06* (2006.01)
*F02D 41/02* (2006.01)

(52) U.S. Cl.
CPC .......... *F02D 41/22* (2013.01); *F02D 41/1475* (2013.01); *F02D 2041/0265* (2013.01); *Y02T 10/47* (2013.01)

(58) Field of Classification Search
CPC ........... F02D 2041/0265; F02M 26/04; F02M 26/05; F02M 26/06; Y02T 10/47; Y02T 10/144; F01N 3/10; F01N 3/101; F01N 3/103; F01N 3/023
USPC .................. 60/605.2, 285, 274, 277; 701/108
See application file for complete search history.

(56) References Cited

U.S. PATENT DOCUMENTS

| | | | | |
|---|---|---|---|---|
| 6,863,058 B2* | 3/2005 | Kurtz | ................. | F02D 41/0275 123/295 |
| 7,111,452 B2* | 9/2006 | Miyoshi | ............. | F02D 41/0275 60/285 |
| 7,831,370 B2* | 11/2010 | Kuronita | ............ | F02D 41/1448 701/103 |
| 7,854,114 B2* | 12/2010 | England | ............. | F02D 41/0245 60/285 |
| 8,230,843 B2* | 7/2012 | Kurtz | ................. | F02D 41/0065 123/568.12 |
| 8,402,751 B2* | 3/2013 | Bidner | ................. | F01N 3/0233 60/285 |
| 8,407,988 B2* | 4/2013 | Bidner | ................... | F01N 3/023 60/295 |
| 8,424,295 B2* | 4/2013 | Bidner | ................... | F01N 3/023 60/289 |
| 8,438,840 B2* | 5/2013 | Bidner | ................... | F01N 3/023 60/285 |
| 8,438,841 B2* | 5/2013 | Bidner | ................... | F01N 3/023 60/285 |
| 8,607,544 B2* | 12/2013 | Uhrich | ................. | F01N 3/0842 60/285 |
| 9,091,223 B2* | 7/2015 | Tsuyuki | ............. | F02D 41/0077 |
| 2009/0038288 A1* | 2/2009 | Tachimoto | .......... | F02D 41/1456 60/277 |
| 2010/0211293 A1* | 8/2010 | Yamada | ................ | F01N 3/0253 701/108 |
| 2011/0072783 A1* | 3/2011 | Hepburn | ............. | F02D 41/0275 60/285 |
| 2011/0072784 A1* | 3/2011 | Hepburn | ................ | F01N 3/101 60/285 |
| 2011/0072787 A1* | 3/2011 | Hubbard | ............. | F02D 41/1454 60/285 |
| 2011/0073070 A1* | 3/2011 | Ruhland | ................ | F01N 3/101 60/285 |
| 2011/0073088 A1* | 3/2011 | Hubbard | ................ | F01N 3/021 123/703 |
| 2011/0231081 A1 | 9/2011 | Suzuki et al. | | |
| 2013/0104544 A1 | 5/2013 | Schilling et al. | | |
| 2014/0090362 A1* | 4/2014 | Eckhoff | .................... | F01N 3/10 60/274 |
| 2014/0121940 A1 | 5/2014 | Surnilla et al. | | |
| 2014/0298802 A1 | 10/2014 | Suzuki et al. | | |
| 2015/0247441 A1* | 9/2015 | Takita | ................... | F01N 11/005 73/114.75 |
| 2016/0237926 A1* | 8/2016 | Tanaka | ................ | F02D 41/1454 |
| 2016/0312721 A1* | 10/2016 | De Smet | ............. | F02D 41/0065 |
| 2017/0009676 A1* | 1/2017 | Sano | ................. | F02D 41/0077 |
| 2017/0058801 A1* | 3/2017 | Vigild | ................... | F02D 41/144 |
| 2017/0362979 A1* | 12/2017 | Nakada | ................ | F02D 41/0235 |
| 2018/0187583 A1* | 7/2018 | De Smet | ............. | F02D 41/0065 |
| 2019/0234328 A1* | 8/2019 | Yonekura | ............ | F02D 41/0077 |

FOREIGN PATENT DOCUMENTS

FR 2 996 879 A1 4/2014
JP 3 280 758 B2 5/2002

OTHER PUBLICATIONS

International Search Report, dated Mar. 13, 2017, from corresponding PCT/FR2016/053103 application.

* cited by examiner

METHOD FOR CONTROLLING A HEAT ENGINE

This application is a US National phase Application under 35 U.S.C. 371 of International Application No. PCT/FR2016/053103 filed on Nov. 25, 2016.

BACKGROUND OF THE INVENTION

The present invention relates to a method for controlling an internal combustion engine, particularly for motor vehicles. The principle of recirculating a portion of the exhaust gases of an engine back to the engine cylinders is known, equipping, for example, a motor vehicle. "Exhaust Gas Recirculation" is commonly referred to as "EGR". Mixing exhaust gas with the admitted fresh air has an impact on the combustion of the fuel mixture. The presence of exhaust gases, which are inert to combustion, and have a high heat capacity, helps reducing the temperature in the cylinders. In a gasoline engine, it also reduces the risk of self-ignition of the mixture, which decreases rattling noises propensity. In addition, exhaust gases recirculation helps reduce pumping losses. The use of exhaust gas recirculation helps reducing the specific fuel consumption, making it a very interesting technology. We also know that in order to guarantee good conversion by the catalytic converter of the pollutants in the exhaust gases, the richness of operation needs to be close to 1, which means that the composition of the mixture of air and fuel is near to the stoichiometry. To minimize pollutant emissions, the major part of the engine operating conditions is thus guaranteed with a richness of 1, also called stoichiometric richness. An exception to this mode of operation is when the exhaust temperature is too high for operation at a richness of 1. These conditions are met when the power delivered by the engine is close to the engine maximum power available. In such conditions, the mixture is voluntarily enriched, which means that it has an excess of fuel in comparison to the stoichiometric mixture. The effect of such enrichment is to lower exhaust temperatures and make them acceptable.

The counterpart is an increase in the consumption of fuel and emission of pollutants. So the enrichment must be kept to a minimum. The value of the enrichment is thus defined for various operating conditions, defined for instance by the speed of rotation of the motor and the delivered torque.

SUMMARY OF THE INVENTION

Due to dispersion of manufacturing between the engines themselves as well as between the various sensors and actuators fitted to the engine, the actual richness of operation may be slightly offset from the set point. Thus, the engine adjuster has to define the richness of operation for the most critical engines among the entire cast of engines. That way, even the more constraining engines meet the acceptable maximum temperature. If the same richness of operation is applied to all engines, some will have a lower exhaust temperature than the acceptable limit. The richness of operation could be reduced in order to avoid cooling down the exhaust gases too much. The purpose of the method is to adapt individually, for each vehicle built, the richness of operation acting jointly on the rate of exhaust gas recirculated.

For this purpose, the invention discloses a method for controlling a combustion engine, said combustion engine comprising an inlet circuit and an exhaust circuit, the method comprising the steps:

determining a temperature of the exhaust gases flowing through the exhaust circuit of the combustion engine, comparing the determined temperature with a maximum threshold, if the determined temperature is less than the maximum threshold, controlling the engine by decrementing the richness of operation by a predetermined value and jointly incrementing by a predetermined value a level of exhaust gases recirculated between the exhaust circuit and the inlet circuit of the combustion engine.

Decrementing the richness helps increase the engine efficiency. The increment in the rate of the recirculated exhaust gas helps decrease the exhaust temperature. By combining the increment of the rate of the recirculated exhaust gas and the decrement of the richness of operation, the chances of being able to operate at stoichiometric richness without exceeding the acceptable temperature threshold is maximized.

In a preferred embodiment, the temperature of the exhaust gases is determined based on information delivered by a sensor mounted on an exhaust circuit of the combustion engine.

The information provided by the sensor makes it possible to know with precision the actual operating temperature regardless of the conditions, and that for each engine produced. The dispersions of operating temperature due to the overall dispersion of engines production and their components all can thus be taken into account.

In another embodiment, the temperature of the exhaust gases is determined at least from a regime of rotation and a thermal engine torque set point.

In order to threshold the cost, the process can also be implemented without using a temperature sensor. The temperature is then estimated from several models, including using the engine rotation speed, the torque set point as well as other parameters help refining the temperature modeling.

In one embodiment, the maximum temperature threshold is a constant value. When the maximum temperature threshold is conditioned by a mechanical component, the maximum temperature threshold can be equated to a constant. Alternatively, the maximum temperature threshold relies on a richness of operation of the engine set point.

For some components, the maximum temperature depends on the chemical composition of the gases, and therefore depends on the richness of operation. This happens for example, for a catalytic converter of pollutants.

Preferably, the operative richness is decremented by reducing the amount of fuel injected.

The operating richness is directly related to the amount of fuel injected into the engine.

Advantageously, the process includes the verification step that the operative richness is greater than 1.

In the case where after decrementing the richness, the engine operates at stoichiometric richness, it is not necessary to continue the decrement of the richness and the iteration of the process stops.

Preferably, the operative richness is determined from information issued by a sensor to measure the oxygen content in the exhaust gases.

A specific sensor, known as lambda or oxygen sensor, is placed in the exhaust.

In one embodiment, the information of the oxygen content sensor placed in the exhaust gases is binary information. This type of sensor is called a binary sensor or "on/off" sensor. The sensor is inexpensive and the associated signal processing is simple.

In a preferred embodiment, the information of the sensor measuring the oxygen content in the exhaust gases is proportional to the oxygen concentration information.

This type of sensor allows for a more precise control of the richness of operation. Advantageously, the method includes the step:

After comparing the temperature with the maximum threshold, detecting the conditions of stability for engine operation (step 62).

The correction of the richness of operation and the recirculated exhaust gases rate is implemented when the temperature measured is stable and representative of a stabilized operation.

Preferably, the recirculated exhaust gases rate is incremented by increasing the exhaust gas recirculation valve inlet.

In one embodiment, the exhaust gas recirculation valve is of the rotating component type.

This type of valve generates small losses of charges, which allows for a high output. Alternatively, the exhaust gas recirculation valve is a type of movable valve with translational movements.

This type of valve usually has a low level of leaks and is resistant to high temperatures. Alternatively or complementarily, the rate of recirculated exhaust gas is incremented by changing the position of variable valve actuator.

By changing the way the engine valves open and close, the amount of residual burnt gas remaining in the combustion chambers can be changed. These gases are then used for the next combustion. This is called internal exhaust gas recirculation. The modification of the valves opening and closing can affect the opening time of the engine valves, or the lift height, or the times of opening and closing.

These different parameters can be changed independently or in combination, for a single cylinder or for all of the cylinders of the engine.

Preferably, the increment in the rate of recirculated exhaust gas can be stopped when the incremented rate reaches a maximum value.

This avoids generating combustion instabilities which can occur with high rates of recirculated gas.

Advantageously, the method includes the following step:
when the temperature becomes higher than the maximum threshold, reincrementing the richness of operation by a predetermined value and jointly decrementing the rate of recirculated exhaust gas by a predetermined value (step 65).

This produces a margin of safety compared to the acceptable temperature threshold. According to one embodiment, the temperature sensor is placed on an engine exhaust manifold.

This location allows measuring the temperature of the gases at a location very close to the place where they are the hottest. Generally speaking, it is interesting to place the temperature sensor as close as possible to the item which temperature you want to monitor.

According to another embodiment, the temperature sensor is placed on one of the cylinder heads of the engine.

This location is appropriate when the exhaust manifold is integrated in the cylinder head of the engine.

According to one embodiment, the temperature sensor is located upstream of a supercharging turbine.

This location allows for precise control of the maximum temperature experienced by the turbine. Thus, the reliability of the supercharging device is favored.

According to one embodiment, the temperature sensor is located upstream of a reduction of pollutants device contained in the engine exhaust gases.

This location allows for precise control of the device meant to clean-up the engine, which promotes both efficiency and reliability of the device. The cleaning device usually includes a catalytic converter and sometimes a particulate filter.

In an example of implementation of the invention, the temperature sensor is equipped with a thermocouple.

This type of temperature measurement sensor helps measure accurately in a wide range of temperatures.

In another example of implementation, the temperature sensor is a thermistor.

This type of temperature sensor is inexpensive and the associated signal processing is simple.

According to an example of implementation of the process, the decrement of the richness of operation is a constant value.

This implementation uses very little memory from the control unit which monitors the engine operation and implements the process.

According to a preferred embodiment, the decrement of the richness of operation is a value depending on a system of rotation of the engine and a torque set point for the engine.

This implementation allows for a finer and faster temperature regulation.

According to an example of implementation of the process, the increment of the recirculation rate is a constant value.

As previously, this implementation uses very little memory from the control unit.

According to a preferred example, the increment of the recirculation rate is a value depending on a system of rotation of the engine and a torque set point for the engine.

The invention also concerns a combustion engine control unit set up to implement the process previously described, and set up to control the combustion engine.

The control unit pilots the operation of the different actuators of the engine, based on the information provided by the various sensors. The control unit also makes all the necessary calculations.

The invention also applies to an exhaust gas recirculation system, including:
a control unit such as described previously,
a combustive gases inlet circuit of a combustion engine with a supercharger set up to increase the pressure of the combustion gases flowing in the inlet circuit,
a recirculation circuit of the exhaust gases, set up to recirculate the exhaust gases from the engine exhaust circuit between the exhaust circuit and the inlet circuit of the combustion engine,
wherein the exhaust gases are recirculated upstream of the supercharger.

This architecture of recirculation of exhaust gases, called "low pressure", is well suited to the gasoline engines.

BRIEF DESCRIPTION OF THE DRAWINGS

The invention will be better understood after reviewing the figures.

DETAILED DESCRIPTION OF THE PREFERRED EMBODIMENTS

Figure 1:
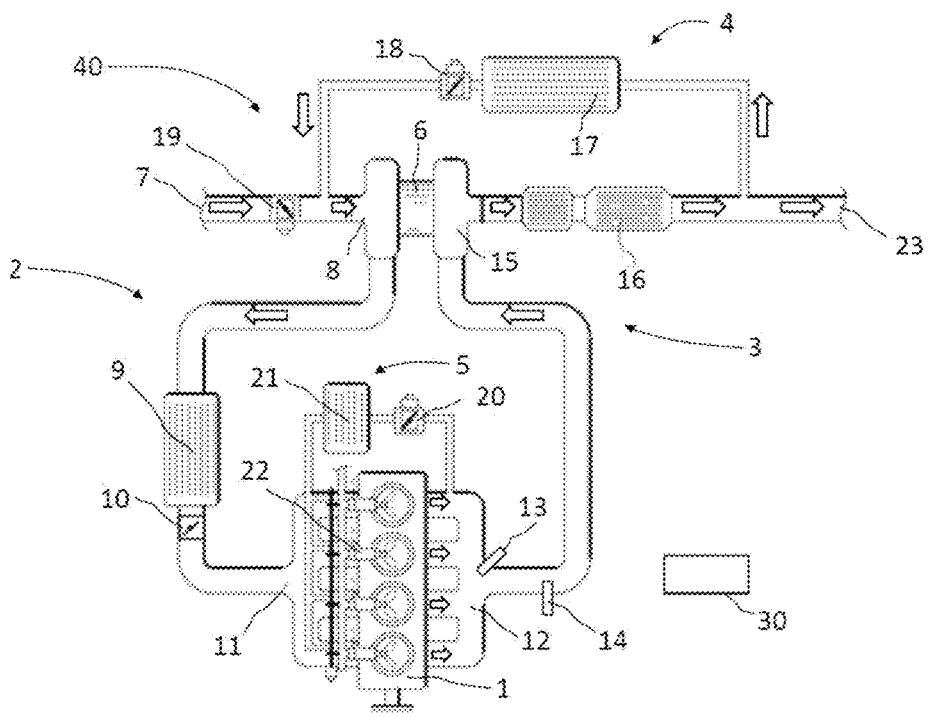
FIG. 1 schematically shows a system with an example of implementation of the invention.

Shown in FIG. 1, a recirculation exhaust circuit 40, including:
- a control unit 30,
- an inlet circuit 2 in combustion gas of a combustion engine 1, with a supercharger 8 set up to increase the pressure of the combustion gas flowing in the inlet circuit 2,
- a recirculation circuit 4,5 of the exhaust gases, set up to recirculate exhaust gases of the engine 1 between an exhaust gases circuit 3 and the engine inlet circuit 2, according to which the exhaust gases are recirculated upstream of the supercharger 8.

The control unit 30 of the internal combustion engine 1 is configured to implement the control process which will be described, and is set up to control the combustion engine 1.

The control unit 30 pilots the operation of the different actuators of the engine 1, based on the information provided by the various sensors. The control unit 30 also makes all the necessary calculations to control the engine 1.

The Engine 1 is a spark-ignition engine.

Combustive gas is supplied the following way: the air intake is made at the entry 7 of the inlet circuit 2, goes through a supercharger 8, then is cooled in the heat exchanger 9. The combustion air flow is adjusted according the operating set point by the throttle body 10.

Combustive air passes then through the intake manifold 11 which distributes the combustion mixture to each of the cylinders of the engine.

The fuel is admitted under pressure in the combustion chambers, by the injectors 22.

After combustion in the engine, the major part of the gas burned in each of the cylinders is gathered by the exhaust manifold which directs them to the turbine 15 of the supercharging device 6.

Some of the burned gas takes the recirculation circuit 5, called 'high pressure'.

The recirculation valve 20 helps regulate the flow of gas recirculated in the circuit 5. The exhaust gas recirculation valve 20 is a movable valve with translational movements. The heat exchanger 21 cools the recirculated gas before being re-sent into the engine 1. In the example shown, the valve 20 is upstream of the heat exchanger 21. The recirculation valve can also be located downstream of the heat exchanger.

The turbine 15 and the supercharger 8 are attached to the same rotating shaft, and the energy supplied to the turbine by the burned gases allows the work of compression of the gases through the supercharger 8. The gases burned after their relaxation in the turbine 15 pass through a pollutants cleaning device 16, which includes a catalytic converter and a particulate filter. Most of the burnt gas is then exhausted to the outside at the exhaust exit 23. Some of the gases go through the exhaust gas recirculation circuit 4, called "low pressure". The heat exchanger 17 cools down the gases, and the valve 18 allows you to regulate the gas flow. The exhaust gas recirculation valve 18 is a rotary flap type.

This type of valve is well suited to 'low pressure' architecture. On the example shown, the recirculation valve 18 is downstream of the heat exchanger 17. According to an embodiment not represented, the valve can also be placed upstream of the heat exchanger.

The heat exchanger 17,21 is of the air/air type. According to an embodiment not shown, at least one of the heat exchangers is of the air/water type.

The temperature of the exhaust gases is determined based on information given by a sensor 13 mounted on a combustion engine exhaust circuit. Based on the example described in FIG. 1, the temperature sensor 13 is set up on an exhaust manifold 12 of the engine 1. The temperature measured is representative of the actual temperature of the exhaust gases. There is a thermocouple on the temperature sensor 13.

This type of temperature measurement sensor can measure accurately the whole range of possible exhaust gas temperatures, ranging from −40° C. to 1000° C. The richness of operation of the engine 1 is determined based on information issued by a sensor 14 measuring the oxygen content in the exhaust gases. According to the example described, the information of the sensor measuring the oxygen content in the exhaust gases is binary information. Which means that the sensor delivers a voltage level between 600 millivolts and 900 millivolts when the composition of the carburized mixture is rich, i.e. in excess of fuel. It delivers a voltage between 100 and 300 millivolts when the mixture is lean, i.e. in excess of air. A regulation strategy, well known by professionals and that will not be detailed here, helps control unit 30 to finely regulate the average richness based on this binary information.

The control process according to the invention includes the steps:
- determining a temperature for the exhaust gases circulating in the exhaust circuit 3 of the internal combustion engine 1 (step 60),
- comparing the determined temperature to a maximum threshold (step 61)
  - if the determined temperature is below the maximum threshold, control the engine by decrementing the richness of operation by a predetermined value and by incrementing jointly the recirculated exhaust gas rate by a predetermined value between the exhaust circuit 3 and the intake system 2 of the combustion engine 1 (step 64).

Figure 2:
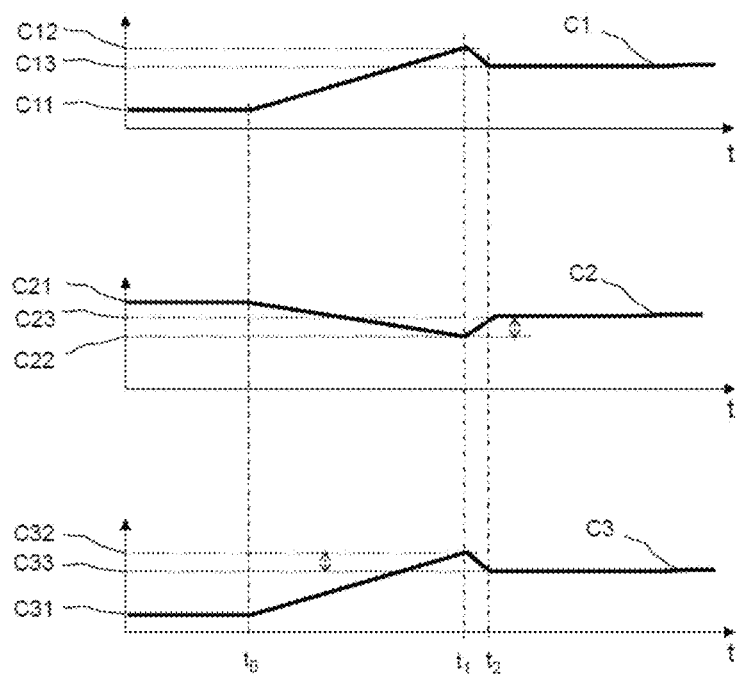
FIG. 2 shows the temporal evolution of different operating parameters of the system from FIG. 1.
Figure 3:
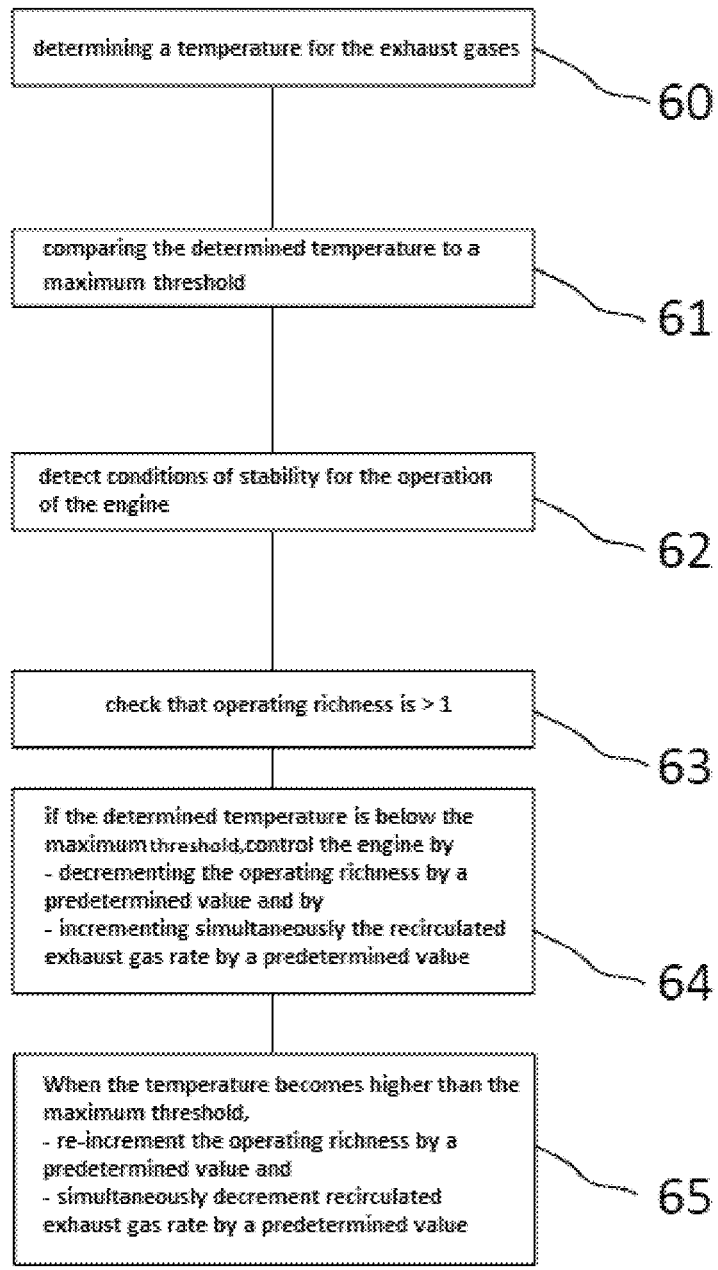
FIG. 3 is a block diagram illustrating the various steps of the process implemented by the device from FIG. 1.

FIG. 2 schematically represents the temporal evolution of various operating parameters during the implementation of the process.

The curve C1 represents the evolution of exhaust temperature depending on the time, the curve C2 represents the evolution of the richness of operation, and the curve C3 represents the evolution of the rate of recirculated exhaust gases.

From the time t0, and until the time t1, the richness of operation is decremented and changes from the value C21 to the value C22. The rate of recirculated exhaust gases is jointly incremented, changing from the value C31 to the value C32. In decreasing the richness of operation, while the mixture is rich, exhaust gas temperature increases, as we can see on the curve C1, changing from the value C11 to the value C12. By incrementing the rate of recirculated exhaust gases, the exhaust temperature will decrease. Incrementing the rate of recirculated exhaust gases helps further decrease the richness of operation. Getting closer as such of a stoichiometric system, the specific fuel consumption decreases, as well as emissions of unburned hydrocarbons and carbon monoxide. The method allows taking into account the dispersions between the engines, so that the safety margins defined for the most constraining engines are not applied to the less restrictive engines. Thus they can benefit from gains in fuel consumption.

The goal of the process is to run as often as possible at stoichiometric richness, it is therefore being implemented only if the richness of operation is greater than 1. The method thus has a verification step in order to check that the richness of operation is greater than 1 (step 63). In the case where after decrementing the richness, the engine operation takes place at stoichiometric richness, it is not necessary to continue the decrement of the richness and the iteration of the process ceases.

In transient operating conditions, the measured temperature is not necessarily representative. To avoid taking into account the transitional effects, the method includes the following step:

After comparing the temperature with the maximum threshold, detect conditions of stability for the operation of the engine (step 62).

The richness of operation is decremented by reducing the amount of fuel injected.

The control unit 30 adjusts the injected fuel set point in order to get the new richness of operation set point.

The recirculated exhaust gases rate is incremented by increasing the exhaust gas recirculation valve inlet. The recirculated exhaust gases rate can be increased by playing on the low pressure valve 18, or on the high pressure valve 20, or jointly on both valves. In the case of Valve 18, Control unit 30 increases the angular position of the component in order to increase the valve inlet. In the case of the valve 20, the control unit 30 increases the lift of a valve. In both cases, the control unit drives the operation of an electric actuation of the mobile body. A position sensor, not shown, allows to precisely control the obtained inlet passage.

The maximum temperature threshold depends on the richness of operation of the engine set point. Indeed, for some components the acceptable maximum temperature depends on the chemical composition of the gases, and thus on the richness of operation. This happens for example, for the pollutants catalytic convertor, which can tolerate a higher temperature in a rich mixture compared to a stoichiometric mixture or in a lean mixture environment.

This makes it possible to adapt the temperature threshold to the operating conditions.

The decrement of the richness of operation is a value depending on a system of rotation of the engine and a torque set point. It is thus possible to adjust the richness decrement speed to the engine point of operation. Along the same line, the increment of the recirculation rate is a value depending on a system of rotation of the engine and a torque set point.

Iterations of the process are stopped when the richness of operation reaches the stoichiometric value. The recirculated exhaust gas rate increment is stopped when the incremented rate reaches a maximum value.

This avoids the need to generate combustion instabilities which can occur with high rates of recirculated gas.

The maximum rate of recirculated exhaust gas depends on the rotation speed of the engine and the torque set point. The method includes the step:

When the temperature becomes higher than the maximum threshold, re-increment the richness of operation by a predetermined value and jointly decrement recirculated exhaust gas rate by a predetermined value (step 65).

This produces a safety margin compared to the acceptable threshold temperature.

As you can see from FIG. 2, after reaching the acceptable maximum temperature C12 at time t1, at time t2 the richness of operation is re-incremented to the value C23 and the recirculated exhaust gases rate is decremented to the value C33. The values of the richness of operation and of the recirculated exhaust gas rate are then frozen for this operating point. The operating temperature is set to the value C13.

The process will be applied on all the points of operation as they arise.

The process may include minor variations of implementation. According to various embodiments:

The maximum temperature threshold is a constant value, the decrement of the richness of operation is a constant value, the increment of the recirculation rate is a constant value. Such implementation uses very little memory in the control unit.

The temperature of the exhaust gases is determined at least from a regime of rotation and an internal combustion engine torque set point. In that case, and to threshold the costs, the process is implemented without the use of a temperature sensor. The temperature is then estimated from several models, including using the rotation speed of the engine, the torque set point. The temperature of the air intake and the outdoor temperature can also be used.

The sensors used in the described system may vary, and according to various embodiments:

the information of the sensor measuring the exhaust gases oxygen content is proportional to the oxygen concentration information.

the temperature sensor is a thermistor. The thermistor can be a component a type of semiconductor or a type of platinum base metal resistor.

The location of the temperature sensor can also be modified. According to various variants of process implementation:

the temperature sensor is set up on a cylinder head of the engine, the temperature sensor is set up upstream of a turbocharging turbine, the temperature sensor is set up upstream of a device reducing the pollutants contained in the engine exhaust gases.

The recirculated exhaust gases rate can also be modified by playing on the internal recirculation. Alternatively or complementarily to the described process, the recirculated exhaust gases rate is incremented by changing the position of a variable valve actuator.

The invention claimed is:

1. A method for controlling a combustion engine (1), said combustion engine having an inlet system (2), an exhaust system (3), an exhaust gas recirculation (EGR) system (40) comprising at least one EGR valve, and an engine control unit (30), said method comprising steps of:

determining an actual temperature of the exhaust gases flowing through the exhaust system (3) by an exhaust gas temperature sensor (13) mounted on the exhaust system (3) of the combustion engine (1) or by estimating an actual temperature of the exhaust gases flowing through the exhaust system (3) from a model via the engine control unit (30);

comparing the actual temperature of the exhaust gases with a predetermined maximum threshold by the engine control unit (30);

when the actual temperature of the exhaust gases is less than the predetermined maximum threshold, decrementing an operating richness of air to fuel mixture by a predetermined value and simultaneously incrementing by a predetermined value an exhaust gas rate of gases recirculated from the exhaust system (3) to the inlet system (2) of the combustion engine (1);
wherein the predetermined value of the decrement of operating richness of air and the predetermined value of the increment of the exhaust gas rate of gases recirculated are determined by the engine control unit (30) from a rotation speed and a torque setpoint of the engine (1).

2. The method according to claim 1, wherein determining the maximum temperature threshold depends on the operating richness of the air to fuel mixture supplied to the combustion engine.

3. The method according to claim 2, further including a step of verifying the operating richness being greater than 1 by the engine control unit (30).

4. The method according to claim 2, wherein determining the operating richness is based on a value being sensed by an oxygen measuring sensor (14) mounted on the exhaust gas system (3).

5. The method according to claim 2, further including a step of closing the at least one EGR valve to stop the increment of the recirculated gases when the increment of the recirculated exhaust gases reach a maximum value.

6. The method according to claim 1, further including a step of verifying the operating richness being greater than 1 by the engine control unit (30).

7. The method according to claim 6, wherein determining the operating richness is based on a value being sensed by an oxygen measuring sensor (14) mounted on the exhaust gas system (3).

8. The method-according to claim 6, further including a step of closing the at least one EGR valve to stop the increment of the recirculated gases when the increment of the recirculated exhaust gases reach a maximum value.

9. The method according to claim 1, wherein determining the operating richness is based on a value being sensed by an oxygen measuring sensor (14) mounted on the exhaust gas system (3).

10. The method according to claim 9, further including a step of closing the at least one EGR valve to stop the increment of the recirculated gases when the increment of the recirculated exhaust gases reach a maximum value.

11. The method according to claim 1, further including a step of closing the at least one EGR valve to stop the increment of the recirculated gases when the increment of the recirculated exhaust gases reaches a maximum value.

12. The method according to claim 1, further including a step of:
when the actual temperature of the exhaust gas becomes higher than the maximum threshold, reincrementing the operating richness of air to fuel mixture to reach a predetermined value and simultaneously controlling the at least one exhaust gas recirculation valve to decrement the exhaust gases recirculated from the exhaust system (3) to the inlet system (2) of the combustion engine (1).

13. The method according to claim 1, whereby the temperature sensor (13) is set up on an exhaust manifold (12) of the engine (1).

14. An internal combustion engine comprising:
an inlet system (2);
an exhaust system (3);
a supercharger (8) for supercharging combustive gases in the inlet system (2);
an exhaust gas recirculation system (40) for recirculating exhaust gases from the exhaust system (3) to inlet system (2);
wherein the exhaust gases are recirculated upstream of the supercharger (8); and
an engine control unit (30) having a non-transitory readable media storing executable instructions to:
determine an actual temperature of the exhaust gases flowing through the exhaust system (3) by an exhaust gas temperature sensor (13) mounted on the exhaust system (3) of the combustion engine (1) or by estimating an actual temperature of the exhaust gases flowing through the exhaust system (3) from a model via the engine control unit (30);
compare the actual temperature of the exhaust gases with a predetermined maximum threshold; and
when the actual temperature of the exhaust gases is less than the a predetermined maximum threshold, decrement an operating richness of air to fuel mixture by a predetermined value and simultaneously controlling at least one EGR valve of the exhaust gas recirculation system (40) to increment the exhaust gas rate of gases recirculated from the exhaust system (3) to the inlet system (2) of the combustion engine (1), the predetermined value of the decrement of operating richness of air and the predetermined value of the increment of the exhaust gas rate of gases recirculated being determined by the engine control unit (30) from a rotation speed and a torque setpoint of the engine (1).

* * * * *